(12) United States Patent
Ryan et al.

(10) Patent No.: US 6,877,307 B2
(45) Date of Patent: Apr. 12, 2005

(54) AUTOMATIC COMBUSTION CONTROL FOR A GAS TURBINE

(75) Inventors: William Richard Ryan, Oviedo, FL (US); Sanem Berksoy, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/832,220

(22) Filed: Apr. 26, 2004

(65) Prior Publication Data

US 2004/0194468 A1 Oct. 7, 2004

Related U.S. Application Data

(62) Division of application No. 10/195,986, filed on Jul. 16, 2002, now Pat. No. 6,742,341.

(51) Int. Cl.[7] .............................................. F02C 9/00
(52) U.S. Cl. ..................................... 60/39.281; 60/775
(58) Field of Search .......................... 60/39.091, 39.27, 60/39.281, 725

(56) References Cited

U.S. PATENT DOCUMENTS

| | | | |
|---|---|---|---|
| 3,826,080 A | 7/1974 | DeCorso et al. | |
| 4,160,362 A | 7/1979 | Martens et al. | |
| 4,199,295 A | 4/1980 | Raffy et al. | |
| 4,394,118 A | 7/1983 | Martin | |
| 4,557,106 A | 12/1985 | Williams et al. | |
| 4,773,846 A | 9/1988 | Munk | |
| 5,145,355 A | 9/1992 | Poinsot et al. | |
| 5,197,280 A | 3/1993 | Carpenter et al. | |
| 5,428,951 A | 7/1995 | Wilson et al. | |
| 5,544,478 A | 8/1996 | Shu et al. | |
| 5,575,144 A | 11/1996 | Brough | |
| 5,706,643 A | 1/1998 | Snyder et al. | |
| 5,784,889 A | 7/1998 | Joos et al. | |
| 5,797,266 A | 8/1998 | Brocard et al. | |
| 6,065,454 A | 5/2000 | Schock et al. | |
| 6,205,765 B1 | 3/2001 | Iasillo et al. | |
| 2003/0014219 A1 * | 1/2003 | Shimizu et al. | ............. 702/184 |
| 2003/0051479 A1 * | 3/2003 | Hogle et al. | ................... 60/772 |

\* cited by examiner

*Primary Examiner*—Louis J. Casaregola

(57) ABSTRACT

A method of controlling a gas turbine engine to provide protection against damaging pressure transients in the combustion process and to ensure compliance with emission requirements. Pressure fluctuations are monitored in a plurality of frequency ranges, and unacceptable pressure transients in different frequency ranges trigger different corrective actions. Unacceptable pressure transients in low and intermediate frequency ranges trigger a change in the pilot fuel fraction of a dual-mode combustor, while unacceptable pressure transients in a high frequency range trigger immediate power reduction in the engine. A control system for a gas turbine engine includes a plurality of timers for defining consecutive time periods for alternate monitoring of pressure transients and not monitoring pressure transients. Corrective action is taken only if unacceptable pressure transients are detected in each of the monitored time periods. As the combustion process is slowly adjusted to optimize emissions, the system will respond rapidly to an indication of an unacceptable dynamic condition.

2 Claims, 4 Drawing Sheets

AUTOMATIC COMBUSTION CONTROL FOR A GAS TURBINE

This application is a divisional of U.S. application Ser. No. 10/195,986, filed Jul. 16, 2002 now U.S. Pat. No. 6,742,341.

FIELD OF THE INVENTION

This invention relates generally to the field of gas turbine engines, and more particularly to a system and method for controlling the combustion process of a gas turbine engine.

BACKGROUND OF THE INVENTION

Gas (combustion) turbine engines are used for generating power in a variety of applications including land-based electrical power generating plants. Gas turbines may be designed to combust a broad range of hydrocarbon fuels, such as natural gas, kerosene, biomass gas, etc. Gas turbines are known to produce an exhaust stream containing a number of combustion products. Many of these byproducts of the combustion process are considered atmospheric pollutants, and increasingly stringent regulations have been imposed on the operation of gas turbine power plants in an effort to minimize the production of these gasses. Of particular concern is the regulation of the production of the various forms of nitrogen oxides collectively known as $NO_x$. It is known that $NO_x$ emissions from a gas turbine increase significantly as the combustion temperature rises. One method of limiting the production of nitrogen oxides is the use of a lean mixture of fuel and combustion air, i.e. a relatively low fuel-to-air ratio, thereby limiting the peak combustion temperature to a degree that reduces the production of $NO_x$.

Another critical concern for the operation of a gas turbine engine is the control of the combustion dynamics. The fuel and air mixture is ignited and burned in the combustor section of a gas turbine engine under extremely high pressure and temperature conditions. Dynamic pressure waves having a frequency ranging from a few hundred hertz to a few thousand hertz occur during the combustion process. If these pressure pulses become excessive, mechanical damage can result in the turbine combustor and downstream components. Increasing the flame temperature can stabilize the combustion process. This approach, however, will exacerbate the problem of controlling $NO_x$ production. Accordingly, there must be a balance between the concerns of reduced emissions and stable combustion.

U.S. Pat. No. 5,544,478 describes a system for optical sensing of combustion dynamics in a gas turbine engine. The fuel/air mixture of the gas turbine is automatically controlled by an emission control circuit that adjusts the position of valves controlling the flow of fuel to the combustor. A combustion dynamics analyzer receives the output of an ultraviolet radiation detector and includes a Fast Fourier Transform for determining the magnitudes of various spectral acoustic frequency components of the detector signal. Combustion dynamics parameters as determined by this spectrum analysis are then applied to a turbine control element to maintain the combustion process within acceptable dynamics and emissions limits.

U.S. Pat. No. 5,706,643 describes a method of minimizing nitrous oxide emissions in a gas turbine engine including the steps of monitoring pressure fluctuations within the engine and increasing the fuel flow to the combustor if the pressure fluctuations exceed a pre-established threshold. Once the pressure fluctuations are brought back under control, the fuel flow to the combustor is readjusted to a lean-burn condition to minimize the emissions.

Two-stage combustors are used on some gas turbine engine designs. Such combustors include a pilot burner for providing a diffusion flame and a secondary burner (sometime referred to as the C stage) for producing a pre-mix flame. The pilot flame generally has a higher fuel-to-air ratio and is used at low power levels and during power transient conditions in order to provide improved stability for the flame front. The pre-mix flame is generally leaner and is used at high power levels to provide the desired low level of emissions.

Traditionally, gas turbine engine settings for a land-based powder generation turbine are manually "tuned" by a combustion engineer during the start-up of the power plant in order to satisfy appropriate emissions criteria without exceeding dynamic load limitations. As emission limits become increasingly stringent, low $NO_x$ combustors must be operated increasingly close to their physical limits and operational margins become smaller. A power plant turbine may be required to operate for days, weeks or even months. During such extended intervals, many variables affecting the combustion conditions may change. For example, the temperature and humidity of the ambient combustion air may change, the fuel characteristics may change, and the combustion system components are subject to wear and drift over time. In addition, short-term fluctuations may also occur in the combustion process. These may be caused either by an actual physical change or may be simply created by an instrumentation anomaly.

SUMMARY OF THE INVENTION

Thus, it is desired to have a gas turbine control system and a method of operating a gas turbine engine that will ensure continuous compliance with permitted emission levels while minimizing the risk of damage to combustion system components.

A method of controlling a gas turbine engine is described herein as including: automatically analyzing transients in a dynamic parameter of a gas turbine engine in a first frequency range and in a second frequency range that extends higher than the first frequency range; and automatically taking a first corrective action in the event of an unacceptable parameter transient in the first frequency range and automatically taking a second corrective action different than the first corrective action in the event of an unacceptable parameter transient in the second frequency range. The actions may include: increasing a pilot fuel fraction in the gas turbine engine in the event of unacceptable pressure pulsations in the first frequency range; and reducing a power level of the gas turbine engine in the event of unacceptable pressure pulsations in the second frequency range. The method may include: using average pressure data to identify unacceptable pressure transients in the first frequency range; and using instantaneous pressure data to identify unacceptable pressure transients in the second frequency range.

A method of controlling a gas turbine is described herein as including: beginning a first time period when a first dynamic parameter value in a gas turbine trips a first set point; monitoring a second dynamic parameter in the gas turbine during a second time period following the first time period; beginning a third time period when the second dynamic parameter trips a second set point; monitoring a third dynamic parameter in the gas turbine during a fourth time period following the third time period; and taking corrective action to reduce instability in the gas turbine when the third dynamic parameter trips a third set point.

A gas turbine power generation apparatus is described herein as including: a compressor for providing a flow of compressed air; a fuel supply for providing a flow of combustible fuel; a combustor for burning the fuel in the compressed air to form a flow of combustion gas; a turbine for expanding the combustion gas and for generating mechanical power; a sensor for generating a signal responsive to pressure transients in the combustion gas; a signal processor for determining the spectral components of the signal; a controller for executing logic for comparing the spectral components of a first frequency range to a first allowable value and the spectral components of a second frequency range extending higher than the first frequency range to a second allowable value to identify unacceptable pressure transients; and logic executable by the controller for implementing a first corrective action in response to an unacceptable pressure transient in the first frequency range and for implementing a second corrective action different than the first corrective action in response to an unacceptable pressure transient in the second frequency range.

BRIEF DESCRIPTION OF THE DRAWINGS

These and other advantages of the invention will be more apparent from the following description in view of the drawings that show.

DETAILED DESCRIPTION OF THE INVENTION

Figure 1:
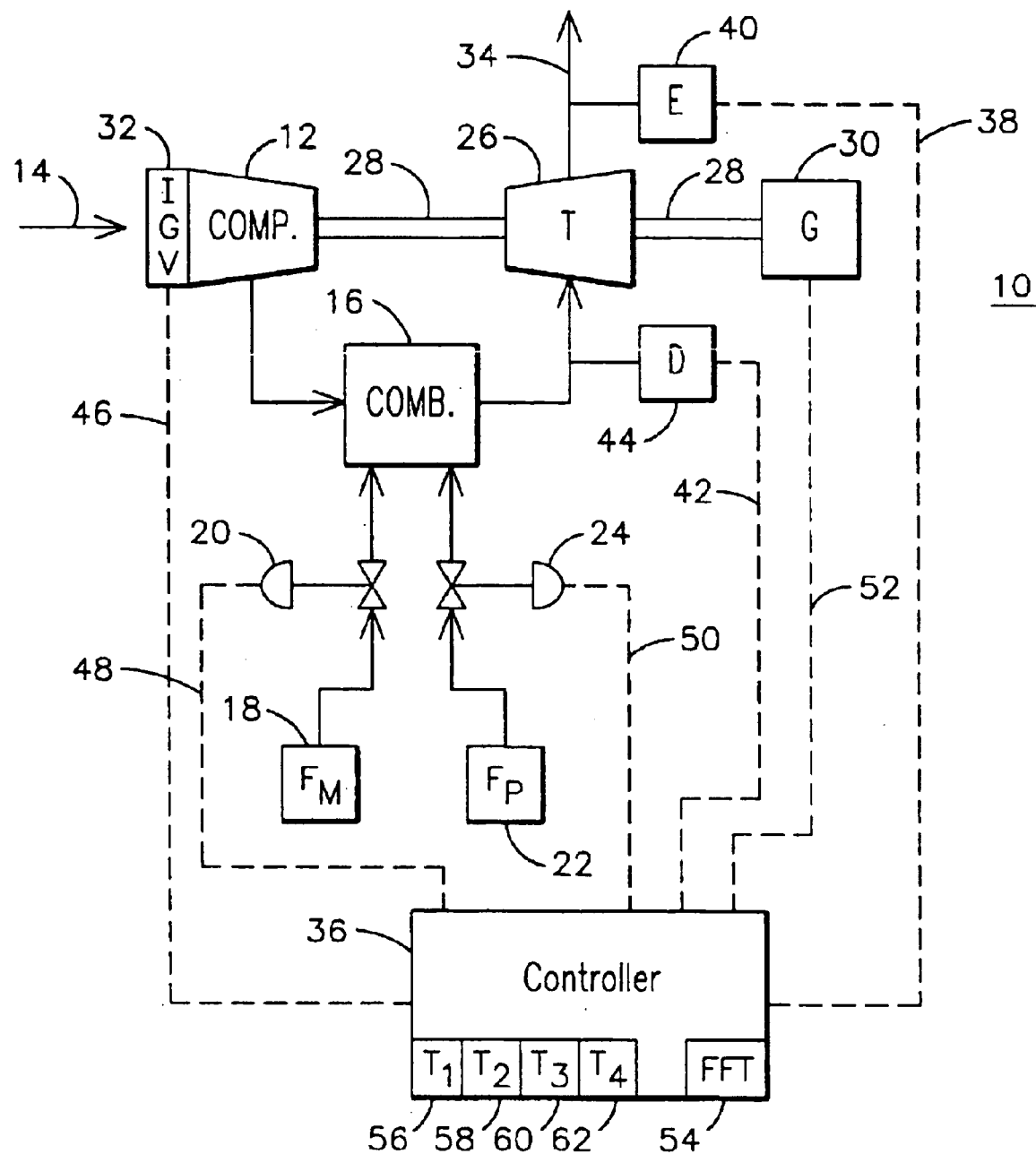
FIG. 1 is a functional diagram of one embodiment a gas turbine power generation system having an improved system for controlling the combustion process.

The gas turbine power generation system 10 illustrated in FIG. 1 includes a compressor 12 for receiving ambient air 14 and for providing compressed air to a combustor 16. The combustor 16 also receives combustible fuel, in this embodiment from a main fuel supply 18 through a main fuel supply throttle valve 20 and from a pilot fuel supply 22 through a pilot fuel supply throttle valve 24. The two fuel flows are directed to one or more pilot burners and C-stage burners in any low-NOx combustor design known in the art. The combustion of the combustible fuel in the compressed air results in the supply of hot combustion gas to turbine 26, where the hot combustion gas is expanded to recover energy in the form of the rotation of shaft 28 that is used, in turn, to drive the compressor 12 and an electrical generator 30. The inlet air is delivered to the compressor 12 through inlet guide vanes 32, and the turbine exhaust 34 is delivered back to the ambient atmosphere.

The system 10 is provided with a controller 36 for automatically implementing the steps necessary for controlling the dynamics of the combustion process and the emissions from the system 10. The term "automatically" is used herein in its usual sense of taking an action in response to an input stimulus without the necessity for any human interaction. Controller 36 may take any form known in the art, for example an analog or digital microprocessor or computer, and it may be integrated into or combined with one or more controllers used for other functions related to the operation of the power generation system 10. The steps necessary for such processes may be embodied in hardware, software and/or firmware in any form that is accessible and executable by controller 36 and may be stored on any medium that is convenient for the particular application.

Controller 36 receives an input signal 38 from an emission analyzer 40 such as may be part of a continuous emissions monitoring system provided as part of gas turbine power generation system 10. In one embodiment, emission analyzer 40 may be a NOx sensor such as. Other types of sensors may be used in other applications, depending upon the emission control requirements for a particular application. Controller 36 also receives an input signal 42 from dynamics sensor 44. Dynamics sensor 44 may be a pressure sensor, an acoustic sensor, an electromagnetic energy sensor, or other type of sensor known in the art for sensing dynamic parameter fluctuations responsive to fluctuations in the combustion process. In one embodiment sensor 44 is a dynamic pressure sensor provided by Vibrometer, S. A. The controller 36 may have an output 46 for controlling the position of the inlet guide vanes 32, outputs 48, 50 for controlling the position of respective throttle valves 20, 24, and output 52 for controlling the power output of generator 30. As will be described more fully below with respect to the operation of system 10, controller 36 may also include a Fast Fourier Transform (FFT) function 54 and a plurality of timers 56, 58, 60, 62 that are used to implement various steps in a control process.

Figure 2:
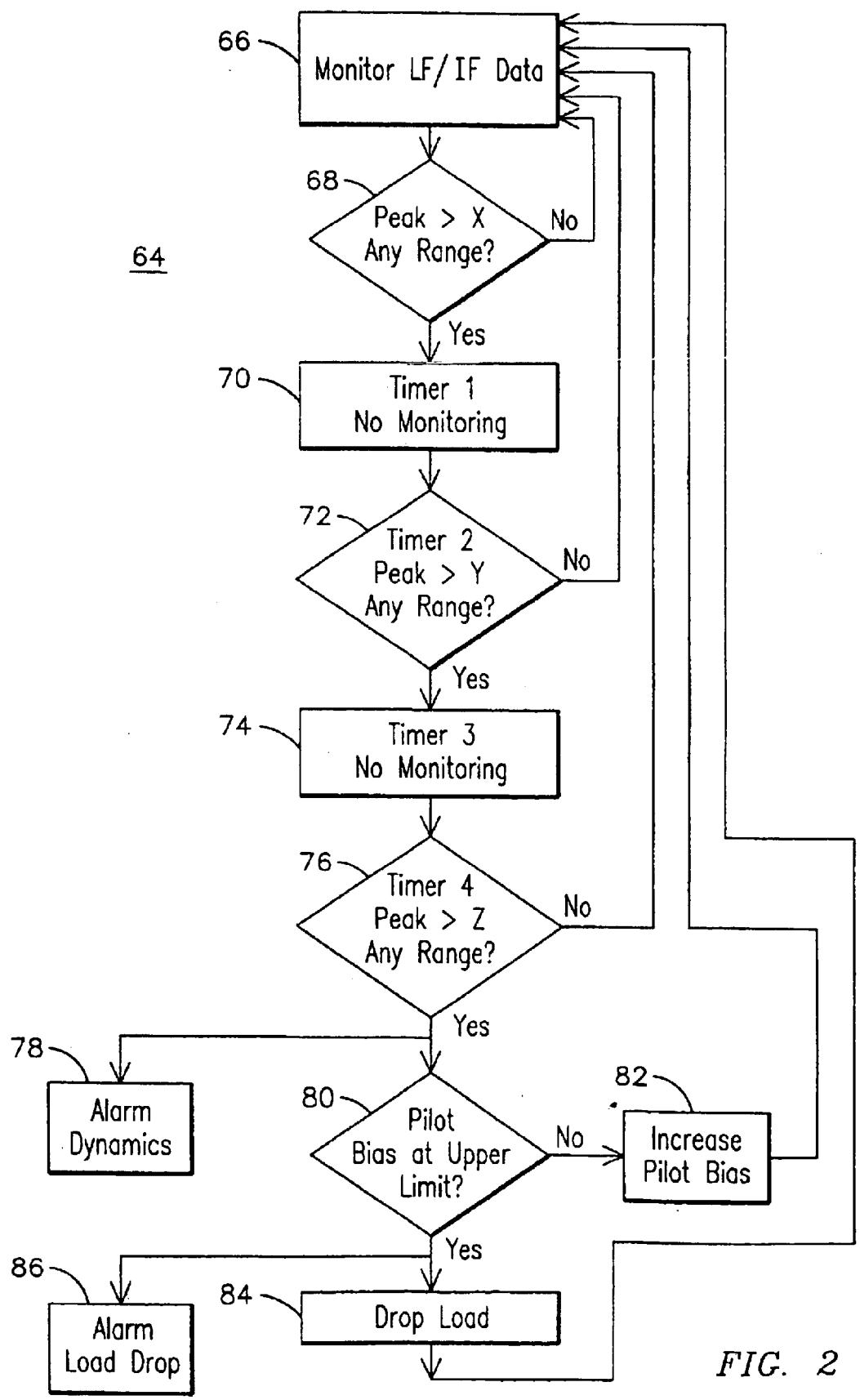
FIG. 2 illustrates the steps of a process implemented in the combustion control system of FIG. 1 for monitoring low and intermediate frequency dynamic fluctuations in the combustion process.
Figure 3:
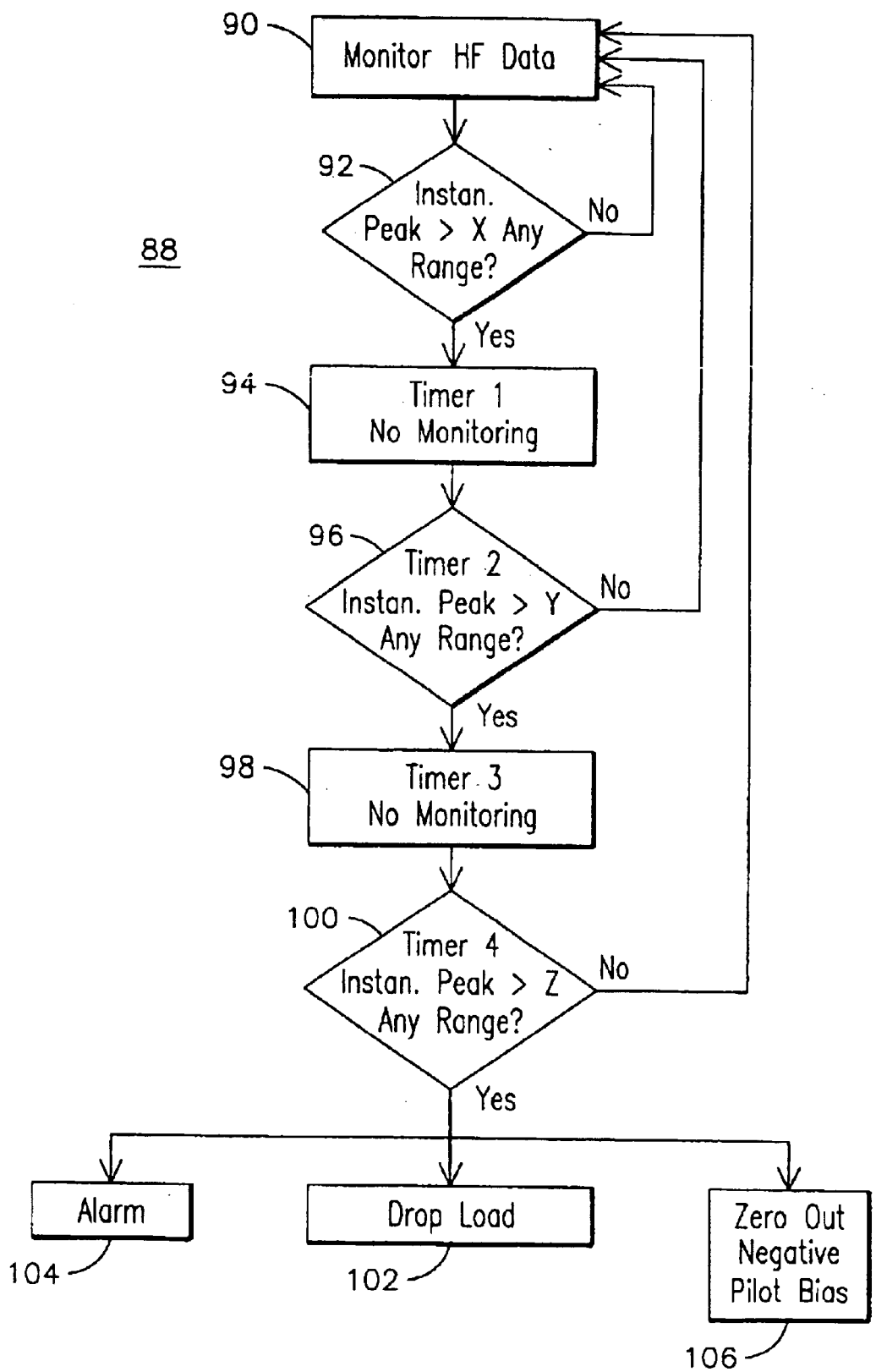
FIG. 3 illustrates the steps of a process implemented in the combustion control system of FIG. 1 for monitoring high frequency dynamic fluctuations in the combustion process.

A method of controlling the gas turbine power generation system 10 will now be described with reference to FIGS. 2-4. Input signal 42 produced by dynamics sensor 44 is received by controller 36 in any manner known in the art. For example, input signal 42 may be an analog output of detector 44 that is provided to an analog-to-digital converter for sampling of the signal 42 at a predetermined sampling rate in order to acquire data suitable for determining spectral frequency components. The sampled data is processed through a spectrum analyzer using FFT function 54 to provide outputs indicative of the component parts of the pressure fluctuations in a plurality of frequency ranges. For example, a low frequency dynamics (LFD) range may be 15–50 Hz; a first intermediate frequency dynamics range (IFD-1) may be 50–100 Hz; a second intermediate frequency dynamics range (IFD-2) may be 100–500 Hz; and a high frequency dynamics range (HFD) may be 500–5,000 Hz. Other frequency ranges may be used, with or without some overlap between the ranges. In general, however, the analysis described herein is done on at least a first frequency range and a second frequency range that extends higher than the first frequency range. The output for each range may be a pressure value in units such as pounds per square inch (psi) as a function of time. The system 10 of the present invention may treat data in the various frequency ranges differently, as described more fully below. In particular, pressure fluctuations in the HFD range may pose a greater risk of damage to the gas turbine combustor 16 and downstream components, and may thus be treated differently than pressure fluctuations in the LFD, IFD-1 or IFD-2 ranges. FIG. 2 illustrates one embodiment of a process implemented automatically in the combustion control system 10 for monitoring low and intermediate frequency dynamic fluctuations in the combustion process, while FIG. 3 illustrates the steps of a process for monitoring high frequency dynamic fluctuations in the combustion process.

Process 64 of FIG. 2 includes step 66 wherein the pressure fluctuation data developed by the FFT function 54 is monitored for each of the respective LFD, IFD-1 and IFD-2 ranges. It is determined at decision step 68 whether or not the value of the data exceeds a predetermined set point value for each respective frequency range. This may be done using an instantaneous value or an average value over a period of time. In one embodiment, process 64 is implemented for both instantaneous data and for averaged data, with appropriate set points being selected accordingly. Representative set point values may be 0.5 psi for the LFD range; 2.0 psi for the IFD-1 of a simple cycle gas turbine power plant application or 1.0 psi for the IFD-1 of a combined cycle gas turbine power plant application; and 2.0 psi for the IFD-2 range. If the monitored data exceeds such set point in any one of the LFD, IFD-1 or IFD-2 ranges, a first timer 56 is started at step 70. The purpose of this timer is to provide a buffer period for any anomalous pressure spike to clear. During this time period the dynamic levels will not be monitored. Such time period may be 5 seconds and may be programmable. Once the time period of step 70 is completed, a second timer 58 is started at step 72. Dynamics in each of the frequency ranges will be monitored during this time period, which may be 30 seconds, for example. If no measured peak (instantaneous or average as the case may be) exceeds its limit for the respective frequency range during this time period, then all timers are reset to zero and the process returns to step 66. On the other hand, if any peak in any range exceeds it respective limit during this time period, then a third timer 60 is started at step 74. This time period is similar to the time period of step 70 in that no monitoring is done and the system is given a chance to return to normal dynamics levels. This time period may have the same or a different duration than the time period of step 70. Once this time period has ended, a fourth timer 62 is started at step 76 to define a time period during which the dynamics data is again monitored. The duration of this time period may be the same as or different than that of step 72. If no measured peak exceeds its respective limit during this time period, then all timers are reset to zero and the cycle begins again at step 66. However, if the set point of any range is exceeded, an alarm may be initiated at step 78 to provide the operator with an early indication that system performance has degraded. The system 10 also automatically takes action to reduce the dynamic fluctuations in the combustion process. In a dual mode combustor 16, this may be done by increasing the pilot bias at step 82, i.e. increasing the flow of fuel through throttle valve 24 and/or decreasing the flow of fuel through throttle valve 20. The pilot fraction may be increased by 0.125% in one embodiment. Once the pilot bias has been increased, all timers are reset to zero and the monitoring cycle begins again at step 66.

Other embodiments of this process may be used. For example, another example of an action that may be taken at step 82 to reduce dynamic pressure fluctuations in the system 10 is to increase the fuel/air ratio in combustor 16. The timers 56, 58, 60, 62 may be embodied as separate components, electronic or mechanical, or as a single timer controlled separately for each of the defined time periods. Furthermore, the dynamic parameter being monitored in each of the successive time periods in the example described above is the same in each period. Other embodiments may monitor a first dynamic parameter during one or more of the time periods and may monitor a second different dynamic parameter during other time periods. Finally, the above embodiment describes pressure as exceeding an allowable value, however, other dynamic parameters may trip a preestablished set point by achieving an excessively high or low value as appropriate.

Because there is an upper limit to the allowable pilot fuel fraction, it is necessary at step 80 to determine if an upper limit for the pilot bias has been reached prior to the corrective action of step 82. The pilot fuel fraction is normally defined as a function of the power level of the system 10 in a set of fuel fraction schedules as are known in the art. A maximum allowable deviation from those schedules may be defined, for example, no more than ±1.5%. If the maximum bias has not previously been attained, the process proceeds to step 82. If, however, the system is already operating at a maximum allowable pilot fuel fraction, then an alternative corrective action is taken at step 84 by dropping load on the system 10. A separate alarm 86 may be provided to alert the operator of the reduction in power level. In one embodiment, the power level may be dropped by 15 MW at a rate of 15 MW/min. Appropriate repositioning of fuel throttle valves 20, 24 and control of generator 30 are used to accomplish this change. The existing positive pilot bias remains in place during this load change step 84. Once the load has been dropped, the process is repeated beginning at step 66 until the dynamic performance is returned to acceptable levels.

In parallel to the steps of process 64 of FIG. 2, the system 10 is separately making use of the HFD range information with process 88 of FIG. 3. The high frequency range data is monitored beginning at step 90. If the peak instantaneous value of the pressure data exceeds a predetermined set point at step 92, a first timer 56 is initiated at step 94. During this first time period, for example 5 seconds, no monitoring is done to allow spurious pressure fluctuations to clear. Once the first timer is complete, a second timer 58 is started at step 96 to define a second time period during which the HFD data is monitored. If the data remains below the set point value, the timers are reset and the process returns to step 90. If, however, an instantaneous peak of the HFD data exceeds a predetermined threshold, then a third timer 60 is started at step 98 to define a third time period during which the data is not monitored. Upon the completion of the third time period, a fourth timer 62 is started at step 100 and the instantaneous peak level is monitored. If the allowable set point is not exceeded, the timers are reset and the process returns to step 90. If the HFD data exceeds the predetermined set point during this fourth period, then corrective action is taken at step 102 to reduce system load and to initiate an alarm at step 104. Simultaneously, any positive pilot fuel fraction is maintained and any existing negative pilot fuel fraction bias is returned to zero at step 106. The corrective action of process 88 is to immediately reduce load at step 102 without iterating through a sequence of pilot fuel fraction increases, as is done at step 80 of process 64. This difference is implemented because high frequency pressure fluctuations have been found to augment more quickly than will low or intermediate frequency pressure fluctuations. Furthermore, high frequency dynamics in a gas turbine engine have been found to be relatively less responsive to changes in the fuel mixture than are low frequency dynamics. The drop in load should be accomplished quickly to avoid damage to combustion hardware, for example at a rate of 300 MW/min for 3 seconds to achieve a 15 MW power reduction. This rate of power reduction may be faster than the rate of power reduction used at step 84 since the risk of damage to the hardware is greater as a result of the dynamics of the system. The automatic process 88 provides for the immediate reduction in load upon the diagnosis of a HFD problem, while at the same time providing protection against load reductions caused by spurious pressure fluctuations.

Figure 4:
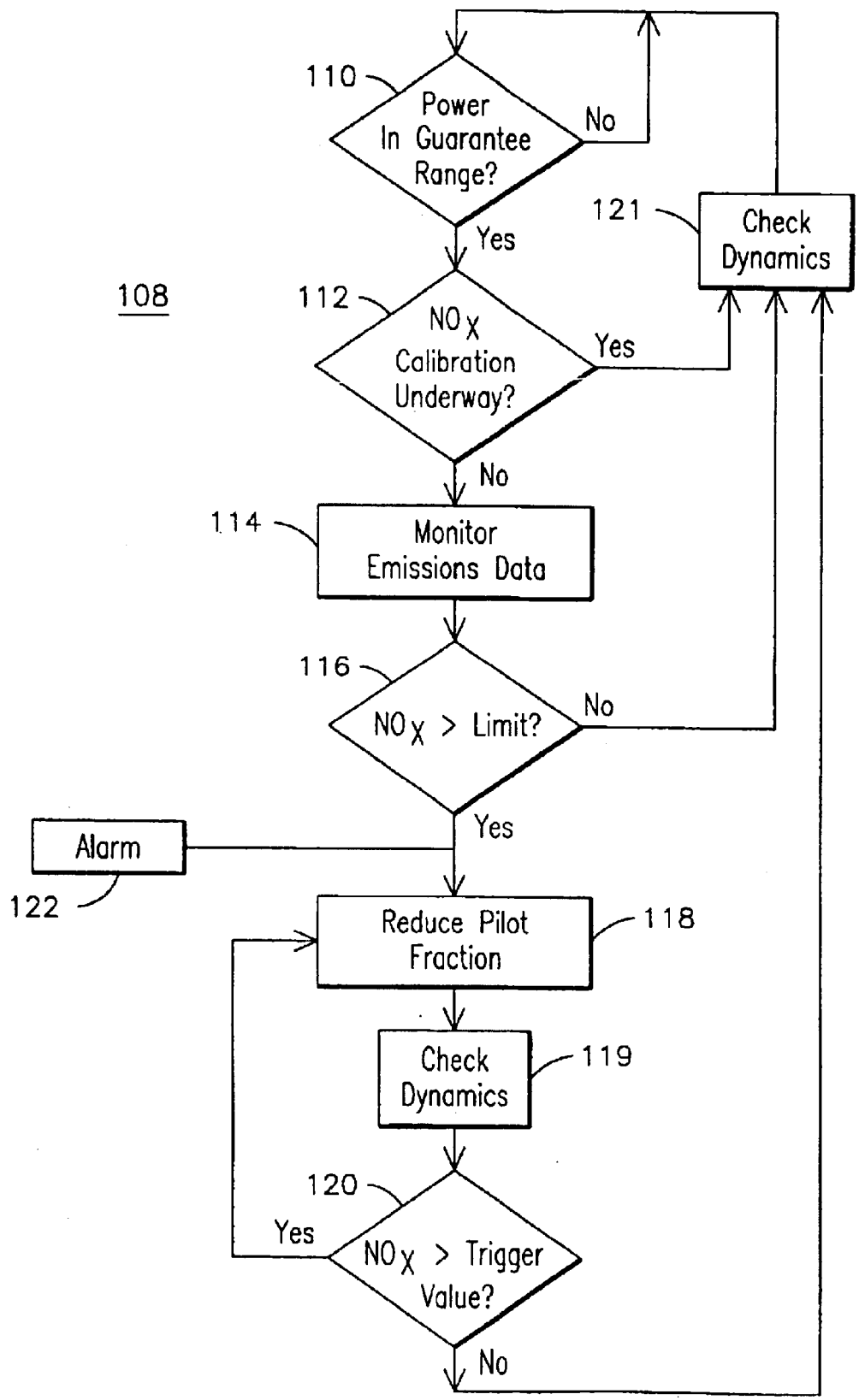
FIG. 4 illustrates the steps of a process implemented in the combustion control system of FIG. 1 for monitoring emissions from the gas turbine.

Controller 36 may also include the necessary programmed instructions for implementing an emissions detection and mitigation process 108 that is integrated with dynamics monitoring, as shown in FIG. 4. A first decision step 110 is to determine if the system 10 is operating within a range of power levels where the emission levels are guaranteed. For example, it is not uncommon for emission levels to be guaranteed for only high power levels, such as 70% power and higher. Furthermore, emissions are not monitored during any calibration of the continuous emission monitoring system, such as during a NOx calibration test at step 112. If the system 10 is operating at an emission guarantee power level and there is no calibration underway, the emission level is monitored at step 114 such as by monitoring the output signal 38 from emissions sensor 40. If the emissions level is below a predetermined threshold at step 116, the process returns to step 110 after checking dynamics at step 121. In one embodiment, a one minute time-averaged value of 15% $O_2$ corrected NOx is used to determine if emissions limits are being met. The process used to check dynamics may include the steps described above with respect to FIGS. 2 and 3. If changes in the operating conditions, such as ambient temperature, humidity, etc. result in an increase of emissions above a predefined limit value as determined at step 116, then downward biasing of the pilot fuel fraction or other corrective action is automatically initiated at step 118. The change in this combustion parameter is generally a small change since the change in emissions level is generally due to a gradual change in combustion conditions. At this point the dynamics are again checked at step 119, such as by the process described in FIGS. 2 and 3. Any unacceptable dynamics condition will trigger the appropriate corrective action, and such corrective action will generally result in a rapid change in the combustion conditions to quickly terminate the unacceptable dynamics event. The gradual reduction in pilot fuel fraction or other correction to emissions is repeated until the emissions level trigger level is achieved at step 120. The emissions trigger level of step 120 and the emissions limit value of step 116 may be the same value, perhaps just below a guaranteed value, or they may be individually tunable. An alarm may be provided at step 122 to provide early warning of exceeding the emissions threshold when the system 10 is operating at a power level in a guarantee range. Note that the alarms of dynamics processes 64 and 88 are provided at all power levels.

The system 10 may be operated with or without the automatic emissions monitoring/control routine of FIG. 4. At all times when the system 10 is operating, the HFD range dynamics process of FIG. 3 may be implemented. The LWD, IFD-1 and IFD-2 range dynamics process of FIG. 2 may be implemented at or near base load operating conditions. The process of FIG. 4 may be implemented only in the guaranteed range of emissions compliance. As the unit is accelerated and loaded, the combustion conditions may initially be set in accordance with pre-established fuel fraction schedules. A change in the power level of the gas turbine system 10 may result in the initiation of undesirable dynamic fluctuations in the combustion process. Accordingly, before a change in load is permitted, any existing negative pilot bias should be reset to zero. This may be done by administrative procedure or by an automatic process implemented by controller 36. If a positive pilot bias exists, any load change should be made without changing the bias. Once at a desired power level, the pilot fuel fraction may be gradually decreased until a dynamics limit is exceeded, as determined by processes 64, 88. Alternatively, the pilot fuel fraction may be gradually decreased until the emissions are below a guaranteed or desired level without exceeding any dynamics limit. Thereupon, the automatic monitoring processes of FIGS. 3–5 are effective to account for any change in the system or ambient conditions that would effect emissions or dynamics over the long term operation of the unit.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A gas turbine power generation apparatus comprising:

a compressor for providing a flow of compressed air;

a fuel supply for providing a flow of combustible fuel;

a combustor for burning the fuel in the compressed air to form a flow of combustion gas;

a turbine for expanding the combustion gas and for generating mechanical power;

a sensor for generating a signal responsive to pressure transients in the combustion gas;

a signal processor for determining the spectral components of the signal;

a controller for executing logic for comparing the spectral components of a first frequency range to a first allowable value and the spectral components of a second frequency range extending higher than the first frequency range to a second allowable value to identify unacceptable pressure transients; and logic executable by the controller for implementing a first corrective action in response to an unacceptable pressure transient in the first frequency range and for implementing a second corrective action different than the first corrective action in response to an unacceptable pressure transient in the second frequency range.

2. The apparatus of claim 1, further comprising a timing mechanism associated with the controller for defining a plurality of time periods for use in identifying the unacceptable pressure transients.

* * * * *